March 17, 1964 D. I. SPASH ETAL 3,125,656

HIGH FREQUENCY HEATING APPARATUS

Filed Dec. 26, 1962 5 Sheets-Sheet 1

Inventors
Christopher E. M. Tibbs
David I. Spash
By Kemon, Palmer & Stewart
Attorney Inventors
Christopher E. M. Tibbs
David I. Spash
By
Kemon, Palmer & Stewart
Attorneys

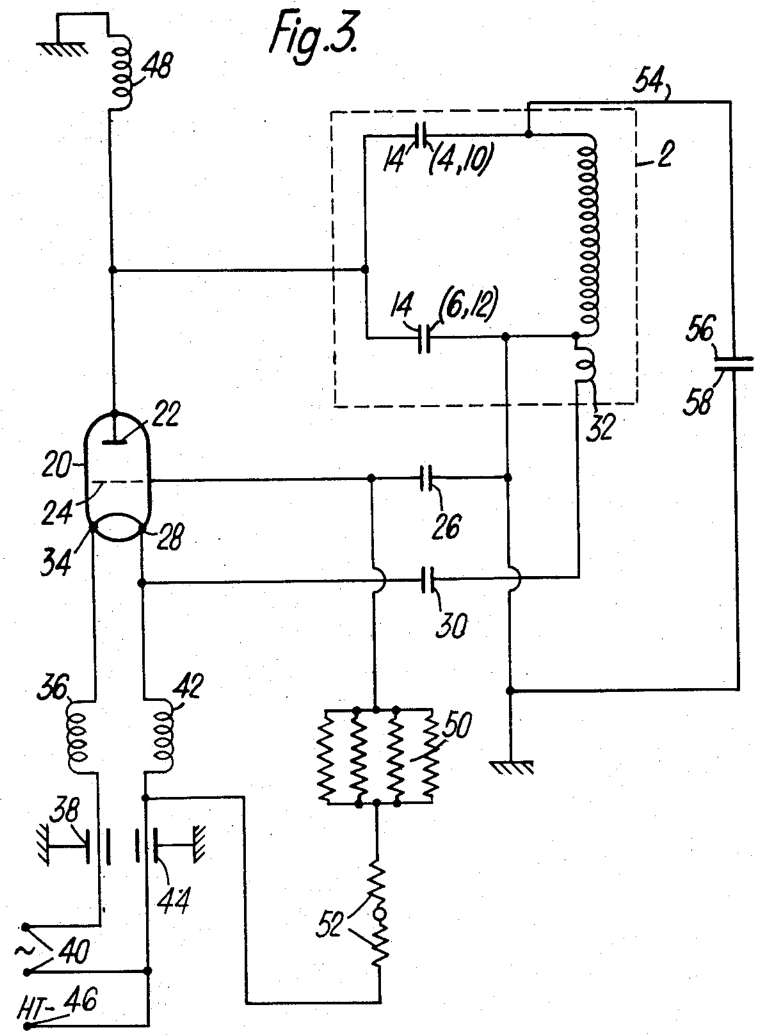
Inventors
Christopher E. M. Tibbs
David I. Spash
By Kemon, Palmer & Stewart
Attorneys

HIGH FREQUENCY HEATING APPARATUS

Filed Dec. 26, 1962 5 Sheets-Sheet 4

Inventors
Christopher E. M. Tibbs
David I. Spash
By
Kemon, Palmer & Stewart
Attorneys

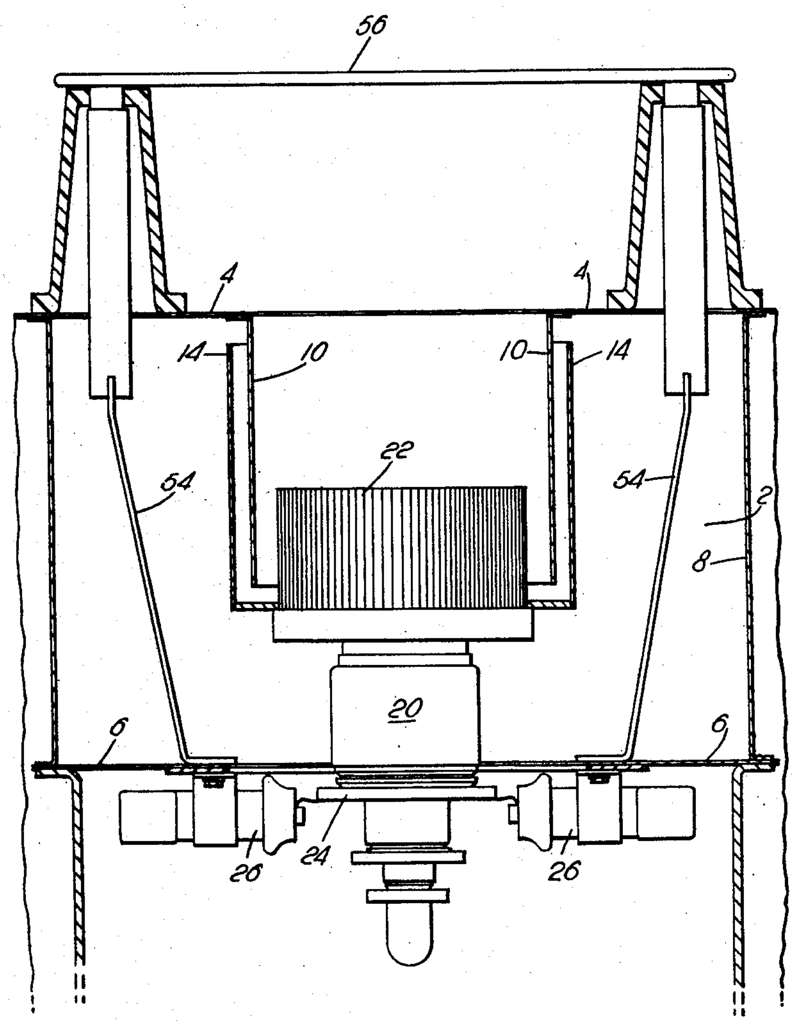
Inventors
Christopher E. M. Gibbs
David I. Spash
By Kemon, Palmer,
Stewart & Estabrook
Attorneys 3,125,656

United States Patent Office 3,125,656
Patented Mar. 17, 1964

3,125,656

HIGH FREQUENCY HEATING APPARATUS

David Isaac Spash and Christopher Evan Mundell Tibbs, Wokingham, England, assignors to Radyne Limited, Wokingham, England, a British company Filed Dec. 26, 1962, Ser. No. 247,400
Claims priority, application Great Britain Oct. 26, 1962
16 Claims. (Cl. 219—10.67)

This invention relates to oscillators for use in high frequency dielectric heating equipment.

According to the invention, the oscillator comprises an oscillator valve and a resonant circuit within which is an electrical capacitance having a number of capacitor sections, which may include the inter-electrode capacitance of the valve, and which are effectively connected in series, an oscillatory voltage being developed or applied across one of the said sections. In this way, an increased voltage is obtained across the ends of the capacitor chain. The advantages of such an arrangement are particularly important if the resonant circuit is in the form of a cavity resonator, in which case the end electrodes of the series-connected capacitors are joined to the end plates of the cavity.

In the preferred form of the invention, the cavity resonator includes two conductive members which constitute the end electrodes of the capacitor chain and which extend towards each other from opposite end plates of the cavity but do not meet. The other electrodes of the two capacitors are formed by a common electrically conductive member which is situated within the first two conductive members. The oscillator valve is of the kind having an external metal anode and this is connected to the common electrode of the capacitor chain, the grid of the valve being connected to one of the end plates of the cavity and thus to one of the end electrodes of the capacitor chain.

With this arrangement, the oscillatory voltage between the grid and anode is applied between the common capacitor plate and one end plate of the cavity, and the circulating current which passes through the inductive section of the cavity charges the second condenser section in series with the first so that the two capacitor voltages are added in series. The oscillator valve is preferably arranged at least partly within the common capacitor member, and its inter-electrode capacitance may constitute the section of the capacitance chain across which the oscillatory voltage is developed.

For high power apparatus, the anode is connected to earth through a high frequency choke, and the cathode of the valve is connected to the high tension negative supply. This avoids the difficulty of providing an anode blocking condenser in the cavity, which is satisfactory at relatively low voltages, but not at voltages of the order of 6,000 volts. With voltages of this magnitude, the size of a satisfactory anode blocking capacitor would increase the required dimensions of the inner conductor of the cavity so greatly that the cavity would no longer constitute a stable resonator. A cavity of the kind described with the anode connected to earth is suitable for frequencies from 20 megacycles upwards, the valve used being of the kind which has an external metal anode.

In order that the invention may be better understood, an embodiment thereof will now be described with reference to the accompanying drawings, in which:

FIGURE 3 is a circuit diagram of the oscillator;

FIGURE 7 is a diagram of a further cavity oscillator using the inter-electrode capacitance of the valve as one capacitor section in the cavity.

Figure 1:
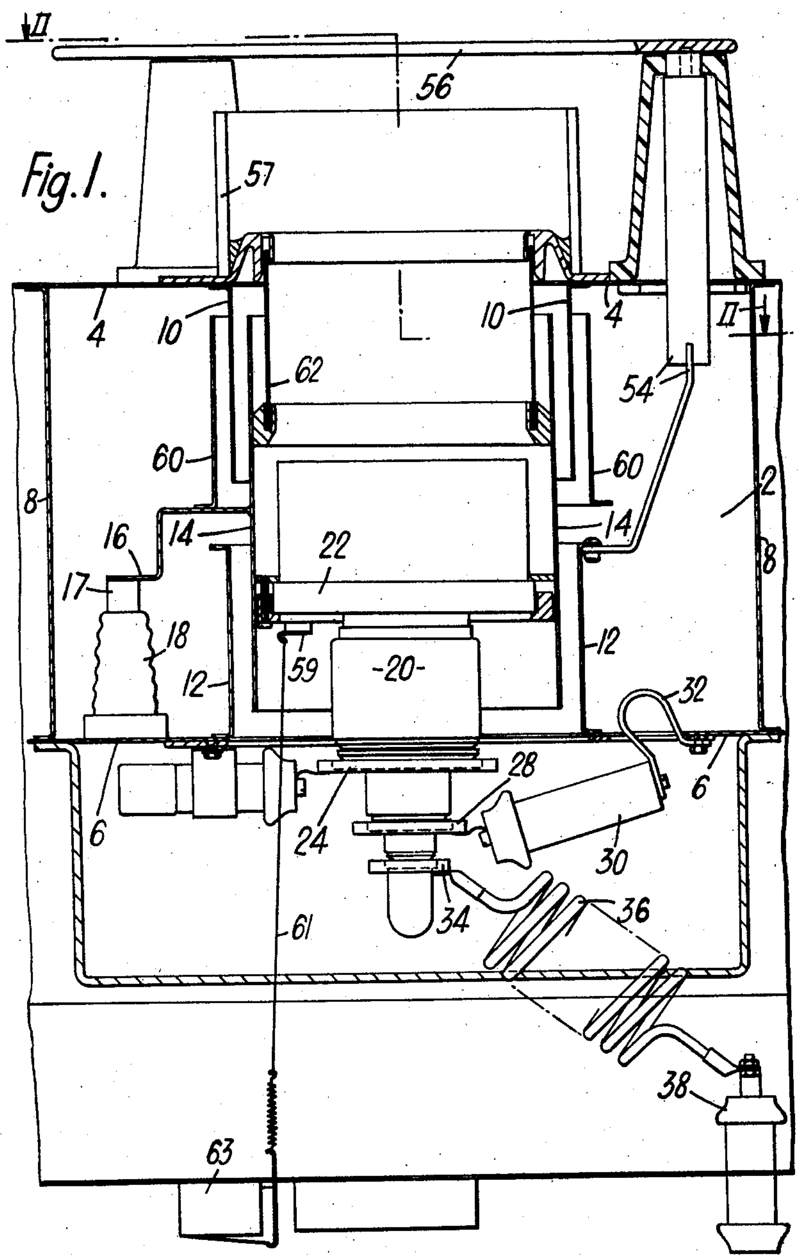
FIGURE 1 is a diagram showing the arrangement of the cavity oscillator and the components associated with it, taken on the line I—I of FIGURE 2.
Figure 2:
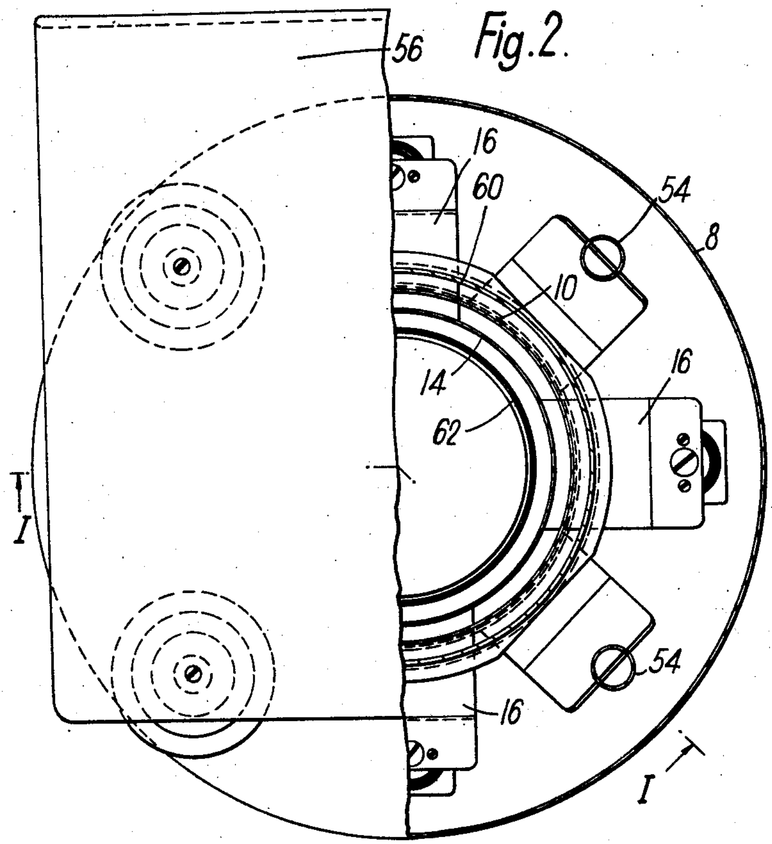
FIGURE 2 is a sectional view of the cavity oscillator of FIGURE 1, on the line II—II in FIGURE 1.

The cavity resonator 2 of FIGURES 1 to 3 is shown in FIGURE 3 as including lumped inductance and capacitance components. It will be realised that in fact the cavity 2 relies to a large extent on distributed inductance and capacitance, and at the frequency and current for which the apparatus is designed the voltage on the inside surfaces of the cavity components may change by thousands of volts within the space of a few inches. As a consequence, the representation of components and connections within the cavity 2 in FIGURE 3 should not be regarded as strictly accurate.

The cavity 2 includes circular end plates 4 and 6 each of which has a central aperture, and a cylindrical outer casing 8. A cylindrical electrode 10 extends downwards into the cavity from the edge of the central aperture in the end plate 4, and a cylindrical electrode 12 extends upwards into the cavity from the edge of the aperture in the end plate 6. There is a gap between the inner ends of the cylinders 10 and 12. A further cylinder 14 which extends almost from top to bottom of the cavity lies within the cylinders 10 and 12 and forms with them two series-connected capacitors. These two capacitors are constituted respectively by the cylinder 10 and the upper half of the cylinder 14, and the cylinder 12 and the lower half of the cylinder 14, the cylinder 14 thus constituting a common electrode for the two capacitors. The cylinder 14 is supported in the cavity by means of members 16 mounted through shock-absorbing supports 17 on insulators 18. The triode oscillator valve 20 has an anode terminal 22 which is supported within and electrically connected to the cylinder 14. The grid terminal 24 of the triode is connected through four radio frequency "earthing" capacitors 26 to the lower end plate 6 of the cavity. A first filament terminal 28 is coupled through three parallel paths, each consisting of a capacitor 30 and a pick-up coil 32 for the radio frequency drive signal, to the end plate 6. The filament terminal 34 is connected through a radio frequency choke 36 and a lead-through capacitor 38 to one terminal of the heater supply 40, as shown in FIGURE 3. The filament terminal 28 is also connected through a radio frequency choke 42 and a bypass condenser 44 to the other terminal of the heater supply. This terminal of the heater supply is directly connected to the H.T. negative supply 46, from which a negative voltage of 6,000 volts is obtained. As shown in FIGURE 3, the anode is connected through a radio frequency choke 48 to the chassis, and the grid is connected through resistors 50 and further resistors 52 constituted by electric lamp bulbs to the negative H.T. supply. From the cylinder 12, which constituted one end plate of the two series-connected capacitors, an output signal is applied through four conductors 54 to the live electrode 56 (FIGURES 1 and 3), the electrode 58 being connected to the chassis. Finally, a cylinder 60 is mounted on the support 16 in the upper half of the cavity, this cylinder together with the cylinders 10 and 14 in the upper half of the cavity providing additional capacitance to balance the capacitance provided by the valve 20 in the lower half of the cavity. A cylinder 62 of insulating material provides an air duct to facilitate the removal of heat from the anode of the valve, and a glass cylinder 57 prevents dirt which may accumulate on the top of the cavity from being swept into the central aperture of the cavity. A solder link 59 is attached to the anode of the valve. The link 59 melts if the valve overheats, and the resultant slackening of the cord 61 causes the opening of a microswitch 63 which results in the breaking of the H.T. supply to the oscillator valve.

If the capacitor sections at the top and bottom of the cavity are of equal capacitance the radio frequency voltage produced across the cavity will be approximately doubled. The current flowing through the capacitive and inductive sections of the cavity will, however, be the same as before because although the voltage is doubled the total capacitance is halved. As a result, the circuit kilovolt amperes are doubled, and this provides much better frequency stability.

The cavity oscillator which has been described operates at about 75 mc./s. and is suitable for a dielectric heater, for which the doubling of the voltage output to the electrodes is of great importance. If the frequency of the cavity is to remain the same as in the case of a cavity having only a single capacitor section, the inductive section of the cavity is doubled so that the product of capacitance and inductance remains the same. The invention enables the production of generators for dielectric heating ovens having a frequency which is approximately twice as high as that of circuits having lumped inductance and capacitance and capable of delivering very high electrode voltages. Moreover, owing to the provision of increased radio-frequency voltages without a corresponding increase in circulating current, a circuit of high efficiency is obtained.

The oven containing the electrode 56 has a resonant frequency between 100 mc./s. and 150 mc./s., the resonant frequency being lowest when the electrodes are at their minimum spacing. We have found that the use of an oven having a resonant frequency which is considerably higher than that of the cavity leads to a reduction in oven losses, as compared with equipment incorporating resonant cavity ovens, in which the oven is resonant at its working frequency.

The use of an earthed anode enables the usual anode blocking capacitor to be omitted, and permits the diameter of the inner conductors of the cavity to be reduced to a minimum. As a result the proportions of the cavity are more conducive to stable operation. If desired, the filament connections can be coupled through two filament transformers connected in a back-to-back arrangement to the heater supply in order to give a sufficient insulation value.

Figure 4:
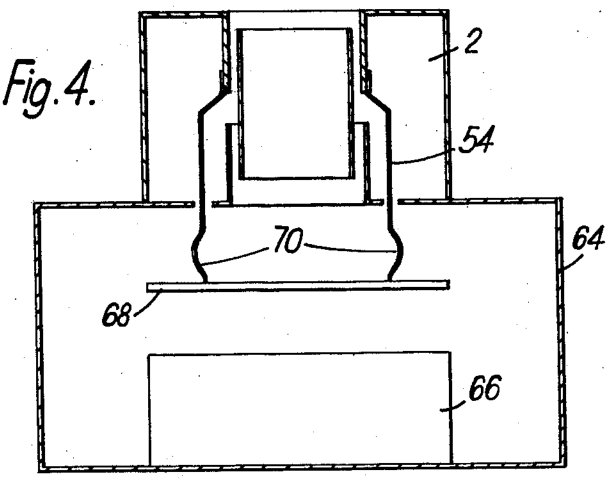
FIGURES 4 and 5 show two alternative equipments incorporating the voltage multiplying cavity oscillator of the invention.
Figure 5:
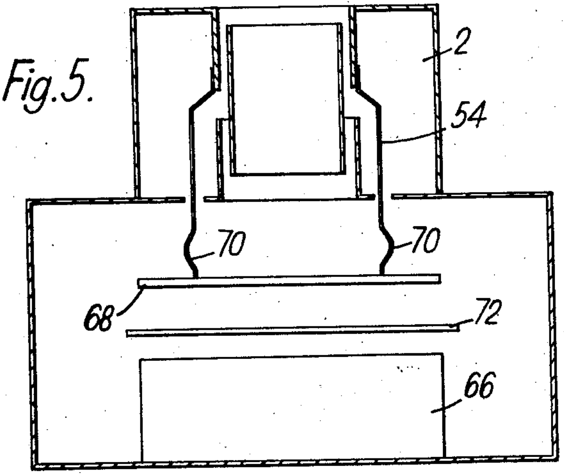

FIGURE 4 shows diagrammatically dielectric heating apparatus in which a voltage-increasing cavity oscillator 2 is mounted immediately above an oven 64 into which is introduced the load 66 to be heated. The live electrode 68 is connected through flexible strips 70 to the output conductors 54. In FIGURE 5 the oscillator 2 is again mounted immediately above the oven 64, but in this case an auxiliary electrode 72 is arranged between the live electrode 68 and the load 66. The use of the auxiliary electrode, which is at a floating potential when the apparatus is in use, removes the need for a large air gap between the live electrode and the load.

Figure 6:
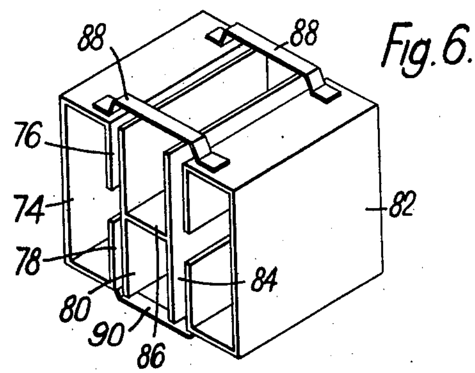
FIGURE 6 is a diagram of an alternative form of resonant circuit embodying the present invention.

The invention can also be applied to resonant circuits employing lumped capacitance and inductance. An example of a resonant circuit of this kind suitable for use at high frequencies and with high currents is shown in FIGURE 6. In this figure a wide strip coil 74 consisting of part of a single turn has its two ends 76 and 78 capacitively coupled to opposite ends of a common plate 80, so that the end 76 forms a first capacitor section with the plate 80 and the end 78 forms a second capacitor section with the plate 80, the two capacitor sections being in series. In a similar manner a wide strip coil 82 has its two ends capacitively coupled to opposite ends of a common plate 84. The two plates 80 and 84 are electrically connected together by a transverse conductive plate 86. The upper ends of the two coils 74 and 82 are connected by conductive bridging members 88 and the lower ends of the two coils are similarly connected by bridging members 90.

In FIGURE 7, the section of capacitor chain across which the oscillatory voltage is developed is constituted by the valve inter-electrode capacitance. The cylindrical elecrtrode 10 extends downwards into the cavity from the edge of the central aperture in the end plate 4, the cylinder 10 and a further cylindrical electrode 14 constituting a concentrated capacitance in the upper half of the cavity. The anode 22 of the triode oscillator valve 20 is supported within and is electrically connected to the cylinder 14 which is supported in the cavity through shock-absorbing supports on insulators (not shown). The grid terminal 24 is connected through four radio-frequency "earthing" capacitors 26 (of which only two are seen in the diagram) to the lower end plate 6 of the cavity. The valve inter-electrode capacitance constitutes a concentrated capacitance in the lower half of the cavity, in series with the capacitance formed in the cylinders 10 and 14. These two capacitances, together with the distributed inductance and capacitance of the cavity, form the tank circuit.

Output signals are applied by way of the conductors 54 to a live electrode 56, the co-operating electrode (not shown) being connected to the chassis.

The present application is a continuation-in-part of our earlier filed application Serial No. 18,642 filed March 30, 1960.

We claim:

1. Radio frequency dielectric heating apparatus comprising: a radio frequency generator including a resonant circuit, which has as an electrical capacitance, a number of capacitor sections connected in series with each other and an oscillator circuit electrically connected across one of said capacitor sections for applying an oscillatory voltage across said section; a heating electrode circuit external to said resonant circuit and coupling means forming a direct electrical connection from the ends of the chain of capacitor sections to the heating electrode circuit whereby an increased alternating voltage developed across said chain of capacitor sections is applied to said heating electrode circuit, said resonant circuit including a wide strip coil consisting of a part of a single turn, the ends of which are capacitively coupled to different parts of a common conductive plate, whereby two series-connected capacitor sections are formed.

2. Apparatus according to claim 1, in which said resonant circuit includes two wide strip coils, each in the form of a part of a single turn the ends of which are capacitively coupled to different parts of a conductive plate, the two conductive plates being electrically connected together.

3. Radio frequency dielectric heating apparatus comprising: a heating electrode circuit; an oscillator having a resonant circuit which includes an electrical capacitance having two capacitor sections which are connected in series; an oscillator valve; means including a connection between the anode of the oscillator valve and the common electrode of said series-connected capacitor sections for applying an oscillatory voltage across one of said capacitor sections; and means whereby the increased alternating voltage developed across the two ends electrodes of the two series-connected capacitor sections is applied to an oscillator output circuit to which said heating electrode circuit is coupled.

4. Radio frequency dielectric heating apparatus comprising: a heating electrode circuit; a cavity resonator oscillator having an outer shell and two end plates; a concentrated electrical capacitance within said shell and having a number of capacitor sections which are effectively connected in series, the end electrodes of said series-connected capacitor sections being joined to said end plates of said cavity; means for applying an oscillatory voltage across one of said capacitor sections, whereby an increased alternating voltage is developed across said chain of capacitor sections; means for applying the increased voltage to the output circuit of the oscillator; and means coupling said heating electrode circuit to the oscillator output circuit.

5. Radio frequency dielectric heating apparatus comprising: a heating electrode circuit; a cavity resonator oscillator, said cavity having an outer shell and two end plates; a concentrated electrical capacitance having a number of capacitor sections which are effectively connected in series disposed within said cavity; an oscillator valve; means including a connection between the anode of the oscillator valve and an intermediate electrode of said series-connected capacitor sections for applying an oscillatory voltage across one of said capacitor sections, whereby an increased alternating voltage is developed across said chain of capacitor sections; means for applying said increased voltage to the oscillator output circuit; and means coupling the output circuit to said heating electrode circuit.

6. Apparatus according to claim 5, in which said cavity resonator includes an inner conductor unit incorporating the series-connected capacitor sections, and in which an oscillator valve is mounted at least partly within said inner conductor unit.

7. Apparatus according to claim 6, in which the anode of the valve is at the potential of the frame of the apparatus, when the latter is in operation.

8. Apparatus according to claim 6, in which a grid drive coil extends into the cavity and is connected between one end plate of said cavity and the cathode of said oscillator valve.

9. Apparatus according to claim 6, in which said oscillator valve is mounted in the cavity with its anode uppermost and in which an air duct is provided above the anode.

10. Apparatus according to claim 6, in which the conductive members of said cavity resonator are of silver-plated copper.

11. An oscillator for R.F. dielectric heating apparatus comprising: a cavity resonator having an outer shell and two apertured end plates; a concentrated electrical capacitance having two series-connected capacitor sections located within said shell, one end electrode of said two series-connected capacitor sections extending into said cavity from the edge of the aperture in one end plate, and the other end electrode of said two series-connected capacitor sections extending into said cavity from the edge of the aperture in the other end plate of said cavity, the common electrode of the two series-connected capacitors being mounted adjacent each of said two end electrodes so as to form a capacitance with each of them; an oscillator valve; means including a connection between the anode of the oscillator valve and the common electrode of said series-connected capacitor sections for applying an oscillatory voltage across one of said capacitor sections, whereby an increased alternating voltage is developed across the end electrodes of said capacitor sections; and means for applying said increased alternating voltage to said heating electrode circuit.

12. Apparatus according to claim 11, in which said cavity resonator includes a central conductor unit incorporating said series-connected capacitor sections, and in which an oscillator valve is mounted so as to extend at least partly in the upper or lower half of the inner conductor unit, an auxiliary electrode being provided adjacent the other half of the inner conductor unit to balance the capacitance introduced by the valve.

13. Radio frequency dielectric heating apparatus comprising: an oscillator including a cavity resonator having an outer shell and two end plates; a concentrated electrical capacitance within said resonator having a number of capacitor sections which are effectively connected in series, the end electrodes of said series-connected capacitor sections being joined to said end plates of said cavity; the oscillator further comprising means for applying an oscillatory voltage across one of said capacitor sections; a heating electrode assembly mounted immediately adjacent the cavity; and means applying the increased alternating voltage developed between end electrode of said series-connected capacitor sections to said heating electrode assembly.

14. Radio frequency dielectric heating apparatus according to claim 13, in which an auxiliary electrode arranged to have a floating potential when the apparatus is in use is arranged between said electrode assembly and an electrode on which the load will be supported.

15. Radio frequency dielectric heating apparatus comprising: a heating electrode circuit; a cavity resonator oscillator, said cavity having an outer shell and two end plates; a concentrated electrical capacitance having two capacitor sections which are effectively connected in series disposed within said cavity, the end electrodes of said series-connected capacitor sections being joined to said end plates of said cavity; an oscillator tube; connections between the anode of said oscillator tube and the common electrode of said series-connected capacitor sections, and between the grid of said tube and one end electrode of said series-connected capacitor sections, whereby an oscillatory voltage is applied across one of said capacitor sections, and an increased alternating voltage is developed across the end electrodes thereof; and means for applying the increased voltage to said heating electrode circuit.

16. Radio frequency dielectric heating apparatus comprising: a heating electrode circuit; an oscillator comprising an oscillator valve and a cavity resonator having an outer shell and two end plates, said oscillator valve being mounted at least partly within said cavity resonator; a concentrated electrical capacitance within said shell and having at least one capacitor section effectively connected in series with the anode-grid inter-electrode capacitance of said valve, the end electrodes of said series-connected capacitor sections being joined to said end plates of said cavity; whereby when said valve is oscillating an increased alternating voltage is developed across said chain of capacitor sections; means for applying the increased voltage to the output circuit of the oscillator; and means coupling said heating electrode circuit to the oscillator output circuit.

References Cited in the file of this patent

UNITED STATES PATENTS

| | | |
|---|---|---|
| 2,944,133 | Tibbs | July 5, 1960 |
| 3,041,435 | Cameron | June 26, 1962 |
| 3,066,210 | Goetter et al. | Nov. 27, 1962 |
| 3,095,548 | Manwaring | June 25, 1963 |